(12) United States Patent
Siebenmorgen et al.

(10) Patent No.: US 11,796,782 B2
(45) Date of Patent: Oct. 24, 2023

(54) OPTICS ARRANGEMENT FOR FLEXIBLE MULTI-COLOR ILLUMINATION FOR A LIGHT MICROSCOPE AND METHOD TO THIS END

(71) Applicant: Carl Zeiss Microscopy GmbH, Jena (DE)

(72) Inventors: Jörg Siebenmorgen, Jena (DE); Ingo Kleppe, Jena (DE); Ralf Netz, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 487 days.

(21) Appl. No.: 17/049,475

(22) PCT Filed: Apr. 11, 2019

(86) PCT No.: PCT/EP2019/059187
§ 371 (c)(1),
(2) Date: Oct. 21, 2020

(87) PCT Pub. No.: WO2019/206646
PCT Pub. Date: Oct. 31, 2019

(65) Prior Publication Data
US 2021/0247600 A1 Aug. 12, 2021

(30) Foreign Application Priority Data
Apr. 26, 2018 (DE) .................... 10 2018 110 083.3

(51) Int. Cl.
*G02B 21/00* (2006.01)
*G02B 21/06* (2006.01)

(52) U.S. Cl.
CPC ..... *G02B 21/0032* (2013.01); *G02B 21/0076* (2013.01); *G02B 21/06* (2013.01)

(58) Field of Classification Search
CPC ............ G02B 21/0032; G02B 21/0076; G02B 21/06; G02B 21/00; G02B 21/0004;
(Continued)

(56) References Cited

U.S. PATENT DOCUMENTS 5,371,588 A * 12/1994 Davis ................. G01B 9/02002
356/489
5,485,272 A * 1/1996 Dirksen .................... G02F 1/33
356/487

(Continued)

FOREIGN PATENT DOCUMENTS

CN 106796360 A 5/2017
DE 10347326 A1 5/2005
(Continued)

OTHER PUBLICATIONS

German Search Report for Priority DE 10 2018 110 083.3 dated Jan. 25, 2019.
(Continued)

*Primary Examiner* — Arnel C Lavarias
(74) *Attorney, Agent, or Firm* — Duane Morris LLP

(57) ABSTRACT

An optics arrangement for flexible multi-color illumination for a light microscope includes an acousto-optical tunable filter ("AOTF"). The AOTF is set up to diffract two light components from incident illumination light into different order-of-diffraction directions. The two light components differ in their wavelengths and polarizations. Alternatively, an electro-optical modulator ("EOM") can be used, with which two temporally successive light components of different wavelengths are set to different polarization directions. A polarization beam splitter separates the two light components of different wavelengths and polarizations into reflection light, which is reflected at the polarization beam splitter, and transmission light, which is transmitted at the polarization beam splitter. A light structuring apparatus
(Continued)

imprints different structures onto the transmission light and the reflection light. The structured transmission light and the structured reflection light are then recombined by the polarization beam splitter or a further polarization beam splitter onto a common beam path.

15 Claims, 3 Drawing Sheets

(58) Field of Classification Search
CPC .............. G02B 21/002; G02B 21/0052; G02B 21/0064; G02B 21/0068; G02B 21/0092; G02B 21/18; G02B 21/36; G02B 21/361; G02F 1/0136; G02F 1/063; G02F 1/11; G02F 1/116
USPC ....... 359/385, 362, 363, 368, 369, 372, 373, 359/386, 388, 389, 390, 434, 245, 246, 359/264, 285
See application file for complete search history.

(56) References Cited

U.S. PATENT DOCUMENTS

| | | | |
|---|---|---|---|
| 5,486,919 A * | 1/1996 | Tsuji | G01N 21/88 356/237.4 |
| 5,917,844 A * | 6/1999 | Hill | G02F 1/11 372/100 |
| 6,898,004 B2 | 5/2005 | Shimizu et al. | |
| 7,180,661 B2 | 2/2007 | Sasaki | |
| 7,359,117 B2 | 4/2008 | Shimizu et al. | |
| 8,411,358 B2 | 4/2013 | Matsuo | |
| 10,191,292 B2 | 1/2019 | Wald et al. | |
| 2008/0225906 A1 | 9/2008 | Ishihara et al. | |
| 2011/0109958 A1 | 5/2011 | Yokoi | |
| 2012/0268812 A1 | 10/2012 | Anhut et al. | |
| 2013/0182306 A1 | 7/2013 | Anhut et al. | |

FOREIGN PATENT DOCUMENTS

| | | |
|---|---|---|
| DE | 102013227107 A1 | 3/2015 |
| DE | 112014001820 T5 | 12/2015 |
| EP | 2437096 A2 | 4/2012 |
| EP | 3190448 A1 | 7/2017 |
| EP | 3422088 A1 | 1/2019 |
| WO | 2013005910 A1 | 1/2013 |
| WO | 2014144053 A2 | 9/2014 |

OTHER PUBLICATIONS

Translation of Written Opinion of the International Searching Authority for PCT/EP2019/059187 dated Aug. 8, 2019.

International Search Report for PCT/EP2019/059187 dated Aug. 8, 2019.

Křížek, Pavel, et al.; "Spatial light modulators in fluorescene microscopy"; Microscopy: Science, Technology, Application and Education 2010; 1366-1377.

Nikolenko, Volodymyr, et al.; "SLM microscopy: scanless two-photon imaging and photostimulation with spatial light modulators"; Frontiers in Neural Circuits 2008; 2(5):1-14.

* cited by examiner

OPTICS ARRANGEMENT FOR FLEXIBLE MULTI-COLOR ILLUMINATION FOR A LIGHT MICROSCOPE AND METHOD TO THIS END

RELATED APPLICATIONS

The present application is a U.S. National Stage application of International PCT Application No. PCT/EP2019/059187 filed on Apr. 11, 2019 which claims priority benefit of German Application No. DE 10 2018 110 083.3 filed on Apr. 26, 2018, the contents of each are incorporated by reference in their entirety.

FIELD OF THE INVENTION

In a first aspect, the present invention relates to an optics arrangement for flexible multi-color illumination for a light microscope in accordance with the preamble of claim 1.

In a second aspect, the invention relates to providing a method for flexible multi-color illumination in a light microscope in accordance with the preamble of claim 14.

BACKGROUND OF THE INVENTION

For numerous microscopy techniques, it is necessary to illuminate a sample with light of different wavelengths simultaneously or in quick succession. For example, it may be desirable to illuminate a sample with two different light wavelengths simultaneously or in quick succession for excitation. It may also be desirable to simultaneously use two different light wavelengths for photostimulation of a sample, or one wavelength for photostimulation and another wavelength for excitation of the sample.

In this disclosure, light of a wavelength can be understood to mean light of a specific wavelength range, wherein the range width is in principle not restricted. Two different light wavelengths can accordingly be understood to mean two different, spaced-apart wavelength ranges.

SUMMARY OF THE INVENTION AND DESCRIPTION OF EMBODIMENTS

In principle, numerous different procedures are known for selecting light of specific wavelengths and for performing beam shaping. For example, wavelength ranges of a broadband light source can be selected in various ways, or different narrowband light sources, for example lasers, can be used simultaneously or in succession. Many different techniques can likewise be used for beam shaping, for example stops or DMDs (digital micromirror devices), with which a spatial structure can be set over a beam cross section.

A generic optics arrangement comprises an AOTF (acousto-optical tunable filter) or EOM (electro-optical modulator). The AOTF is set up to diffract at least two light components from incident illumination light into different order-of-diffraction directions, wherein the two diffracted light components differ in their wavelengths and polarizations. Depending on the circuit and construction, the two light components can be produced simultaneously or in quick succession from the same illumination light. If an EOM is used instead, light components of different wavelengths are directed in temporal succession to the EOM. This can also be referred to as time division multiplexing. For example, light flashes/pulses of different wavelengths can be used. These can have the same polarization. The EOM can then set the two temporally successive light components of different wavelengths to different polarization directions. For this purpose, the EOM can be switched quickly, i.e. the EOM can be switched between successive light components (light pulses). In particular, the EOM can set different polarization directions, for example linear, perpendicular polarization directions, for the two successive light components.

In a generic method for flexible multi-color illumination for a light microscope, provision is correspondingly made for two light components of incident illumination light to be diffracted into different order-of-diffraction directions with an AOTF, wherein the two light components differ in their wavelengths and polarizations, or for two temporally successive light components of different wavelengths to be set to different polarization directions with an EOM.

An AOTF comprises an anisotropic, birefringent medium, for example a glass or a crystal, through which an acoustic wave is transmitted or to which an electric field is applied. As a result, the refractive index varies periodically and incident light is diffracted. Here, incident light is deflected into different directions, which correspond to different orders of diffraction. This can also be done in dependence on the wavelength. Two different wavelengths can thus be deflected into different orders of diffraction. In particular, different wavelengths that are used for example for sample illumination can be selected from the light of a broadband light source, or from the combined light beams of a plurality of lasers. The light component deflected into a first order of diffraction undergoes a polarization rotation and thus has a different polarization than the light component that passes through the medium without being diffracted, that is to say in the zero order of diffraction.

In principle, it is desirable to enable illumination for which two illumination wavelengths are settable and at the same time largely arbitrary beam shaping is made possible. This should be done very quickly and if possible without moving mechanical components.

An object of the invention can be considered to be that of specifying an optics arrangement for a light microscope and a corresponding method, which enable multi-color illumination in a particularly flexible, quickly changeable manner, while at the same time the construction is particularly simple and stable.

This object is achieved by the optics arrangement having the features of claim 1 and by the method having the features of claim 14.

Advantageous variants of the optics arrangement according to the invention and of the method according to the invention are subjects of the dependent claims and will additionally be explained in the description that follows.

In the optics arrangement of the type mentioned above, optics components are provided according to the invention for jointly transmitting the two light components onto a common beam path. A polarization beam splitter with which the two light components are spatially separated in dependence on the polarization, namely into reflection light that is reflected at the polarization beam splitter and transmission light that is transmitted at the polarization beam splitter, is arranged on said common beam path. A light structuring apparatus with which different structures can be imprinted onto the transmission light and the reflection light is provided. The polarization beam splitter or a further polarization beam splitter is arranged in such a way that it combines the structured transmission light and the structured reflection light onto a common beam path. The common beam path can in particular lead in the direction of a sample to be examined.

In an analogous manner, the two light components of different wavelengths and polarizations are separated according to the invention using a polarization beam splitter in the method of the abovementioned type. One of the light components is reflected at the polarization beam splitter as reflection light. The other of the light components is transmitted at the polarization beam splitter as transmission light. Different structures are imprinted onto the transmission light and the reflection light using a light structuring apparatus. The structured transmission light and the structured reflection light are combined onto a common beam path using the polarization beam splitter or a further polarization beam splitter.

The invention utilizes the property that the light component diffracted by an AOTF has a different polarization direction than the undiffracted light component, wherein these two light components can differ in their wavelengths or wavelength compositions, or the invention utilizes the property that different light components that differ in wavelength can be rotated to different polarization directions by an EOM very quickly in succession. The AOTF/EOM can thus output two light components that are polarized in particular perpendicular to each other and differ in their wavelengths. In the prior art, the light component that is not diffracted at the AOTF is often blocked and not used further. In contrast to this, these two light components can be transmitted, specifically onto a common beam path, in the case of the invention. Optics components for this purpose can accordingly be arranged such that they capture both a diffracted and an undiffracted light component, that is to say in particular the light components of a zero and a first order of diffraction. The optics components can comprise, for example, one or more lenses, mirrors, or prisms. Due to the different orders of diffraction, the propagation directions of the two light components differ slightly from one another. Provision may be made for the optics components that follow the AOTF/EOM to be designed to reduce said difference in the propagation directions of the two light components. The fact that the two light components differ in their wavelengths can be used for this purpose. If the optics components have a dispersion (wavelength-dependent refractive power), they can influence the two light components differently. The dispersion and shape of the optics components can be chosen such that a distance between the two partial beams caused by the different orders of diffraction is reduced (rather than increased).

The two light components are guided onto different beam paths by way of the polarization beam splitter, which can in particular be a polarization beam splitter cube. The fact that the two light components can be polarized perpendicular to one another is used in this case. The light reflected at the polarization beam splitter (hereinafter reflection light) therefore corresponds to one of the light components and the transmitted light (hereinafter transmission light) corresponds to the other light component. The beam path onto which the reflection light is directed is referred to below as the first beam path and the beam path of the transmission light is accordingly referred to as the second beam path.

After the two light components have been shaped independently of one another by the light structuring apparatus, they are recombined on a common beam path. This can be done with an additional polarization beam splitter or with the same polarization beam splitter that initially caused the spatial separation.

The polarization beam splitter, the light structuring apparatus, and beam deflection elements can be arranged in such a way that a closed loop is formed together with the first and the second beam path, which loop is traversed by the transmission light and the reflection light in opposite directions. Accordingly, after a structure has been imprinted onto the transmission light by the light structuring apparatus, said transmission light is incident on the polarization splitter again, but from the direction into which the reflection light was deflected at the polarization beam splitter. Analogously, after a structure has been imprinted onto the reflection light by the light structuring apparatus, said reflection light is incident on the polarization splitter again, but from the direction into which the transmission light was transmitted at the polarization beam splitter. Upon this second incidence, the transmission light is transmitted again and the reflection light is reflected again, so that these two are emitted on a common beam path, in particular in the direction of a sample. In order for transmission light to be transmitted again at the polarization beam splitter and for reflection light to be reflected again, the light polarization should either not change or only change temporarily when the closed loop is traversed so that the polarization is the same when it is incident on the polarization beam splitter a second time as when it left the polarization beam splitter the first time.

The light structuring apparatus is designed in such a way that a spatial structure is imprinted onto incident light. The light intensity and/or light phase is accordingly variably changed over a cross section of the light. In a preferred embodiment, the light structuring apparatus comprises a liquid crystal matrix as a structured element, wherein transmissive or reflective gratings or micromirror arrays can generally also be used. The liquid crystal matrix comprises a plurality of independently switchable liquid crystal elements. The liquid crystal elements can be arranged directly next to one another in a two-dimensional pattern. Such a liquid crystal matrix is also referred to as LCoS or LCoS-SLM (LCoS: liquid crystal on silicon; SLM: spatial light modulator). A settable voltage can be applied in each case to the liquid crystal elements, whereby a tilt direction of the liquid crystal molecules of the respective liquid crystal element is settable. In this way, a phase of incident light is changeable in a settable manner, wherein the phase can in principle be shifted as desired within an interval. The polarization direction of the incident light relative to the alignment of the liquid crystal elements here determines whether a variable phase change can be set or not. If the light polarization is parallel to a direction that is referred to below as the effective axis of the liquid crystal matrix, the light phase can be variably adjusted, while light with a light polarization perpendicular thereto passes through the liquid crystal matrix regardless of a switching state thereof, is reflected at the rear side, and returns again, without a phase change being variably settable. In various variants of the invention, such a liquid crystal matrix with a reflective rear side is used, wherein these embodiments can in principle also be modified to form a transmissive liquid crystal matrix through which light passes only once.

With a suitable light polarization, a phase of an incident light beam can thus be set variably over the beam cross section by means of a liquid crystal matrix. An amplitude grating/an amplitude variation can result in the sample plane from said phase grating, for example by blocking external light components.

It can be preferred to use two different liquid crystal regions, wherein one of the two liquid crystal regions serves for shaping the transmission light and the other of the two liquid crystal regions serves for shaping the reflection light. The two liquid crystal regions can belong to different liquid crystal matrices. In this case, the two liquid crystal matrices can have effective axes that are rotated through 90° with respect to one another, with the result that the different polarization directions of the transmission light and of the reflection light lead to only one of the two liquid crystal matrices changing the phase of the incident light in each case. However, liquid crystal matrices are very expensive, so that it can be preferred if the two liquid crystal regions are different regions of the same liquid crystal matrix.

Reflection light can first be directed onto the first liquid crystal region and then onto the second liquid crystal region on the beam path, which forms a closed loop starting from the polarization beam splitter. The reflection light should in this case have a polarization direction by way of which the phase of the reflection light is variably influenced only by one of the two liquid crystal regions. The transmission light, on the other hand, is first directed onto the second liquid crystal region and then onto the first liquid crystal region, wherein it has a polarization direction by way of which the phase of the transmission light is in turn variably influenced only by the other of the two liquid crystal regions. The fact that the transmission light and the reflection light are each variably influenced only by one of the two liquid crystal regions can be achieved by appropriately rotating the polarization direction of the transmission light and of the reflection light:

For this purpose, a polarization rotator for rotating the polarization direction of incident light through 90° can be provided and arranged in such a way that it is traversed twice, namely directly before and directly after being incident on one of the two liquid crystal regions. Due to the light being incident twice, the polarization direction in the end is the same as before, except the polarization direction is rotated through 90° when the light is incident on said liquid crystal region. In this embodiment, the transmission light can thus first be incident on the polarization rotator, then on the second liquid crystal region, then on the polarization rotator, and then on the first liquid crystal region, while the reflected light is incident on these components in the reverse order. Of course, the arrangement can also be modified here so that the transmission light passes through the abovementioned components in the reverse order, while the reflection light passes through the components in the stated order.

The polarization rotator can be formed by a single $\lambda/2$ plate or comprise two $\lambda/2$ plates, of which one $\lambda/2$ plate is traversed before the light is incident on the second liquid crystal region and the other $\lambda/2$ plate is traversed after the light is incident on the second liquid crystal region. The $\lambda/2$ plates are arranged such that their crystal axes are parallel.

It can be preferred that the transmission light and the reflection light each remain uninfluenced when they are first incident on one of the two liquid crystal regions and are influenced only when they are incident thereon for the second time. The liquid crystal regions, the polarization directions of the transmission and reflection light, and, if appropriate, the optical axis of the polarization rotator can be correspondingly aligned. This is conducive to better beam quality.

In a modification of the embodiments described above, a liquid crystal matrix is used with which it is settable whether a polarization direction of incident light is changed, in particular rotated, or not. This takes advantage of the fact that, with a suitable alignment of the liquid crystal matrix, a phase change of only one component of the incident light leads to a polarization rotation of said light, in particular by 90°, or to a polarization change to an elliptical polarization. In particular in connection with a half-wave plate, it can thus be specified whether a polarization direction is such that transmission/reflection light is transmitted in the direction of the sample region or not. Owing to a phase change by means of the liquid crystal matrix, which brings about an elliptical polarization, the proportions to which the transmission/reflection light is reflected and transmitted at the polarization beam splitter can be variably set. This allows amplitude modulation.

In this embodiment, the liquid crystal matrix is not arranged in a closed loop as a beam path. Rather, the reflection and transmission light is directed by means of beam deflection elements onto different liquid crystal regions, preferably of the same liquid crystal matrix, and then directed back to the polarization beam splitter along the same path. The reflection and transmission light can each be directed perpendicularly onto the liquid crystal regions, which is conducive to the beam quality. In order to appropriately influence both the reflection light and the transmission light by means of the same liquid crystal matrix, provision may be made that the polarization direction of the transmission and/or reflection light is rotated with a polarization rotator before it is incident on the liquid crystal matrix.

The reflection light thus travels from the polarization beam splitter on a first beam path via a polarization rotator to a liquid crystal region of the liquid crystal matrix and back to the polarization beam splitter on the same first beam path. The liquid crystal matrix is arranged here such that, depending on the switching state of the liquid crystal elements thereof, no or a variably settable change in polarization is brought about. In particular, a polarization rotation by 90° or a change from linear polarization to circular or elliptical polarization can be brought about. Together with the polarization rotator, a polarization direction of the reflection light can be rotated by 90° or 0°, depending on the switching state of the liquid crystal elements, with the result that the reflection light coming back from the liquid crystal matrix is settably transmitted at the polarization beam splitter in the direction of a sample region or reflected in the direction of the light source, or, in the case of elliptical polarization, transmitted and reflected in variable proportions that are settable by way of the liquid crystal matrix. The optional polarization rotator can be a $\lambda/2$ plate whose optical axis can be at an angle of 22.5° relative to the transmission or reflection light and correspondingly at an angle of 67.5° relative to the other of the transmission or reflection light. An alignment of the liquid crystal matrix can be parallel to the original polarization direction of the transmission or reflection light, as a result of which, depending on the switching state of the liquid crystal elements, a polarization rotation of 90° or no polarization rotation of the incident light (which has already been rotated by the polarization rotator) or a polarization change to elliptical polarization is attained.

In an analogous manner, the transmission light travels from the polarization beam splitter on a second beam path optionally via the polarization rotator or via an additional polarization rotator to another liquid crystal region of the liquid crystal matrix. It travels back to the polarization beam splitter along the same second beam path. The liquid crystal matrix is arranged here such that, depending on the switching state of the liquid crystal elements thereof, a polarization rotation, no polarization rotation, or a change to elliptical polarization is brought about. On the way back to the polarization beam splitter, a polarization direction of the transmission light will have been rotated by 90° or 0° or elliptically polarized downstream of the polarization rotator, depending on the switching state of the liquid crystal elements. The transmission light coming back from the liquid crystal matrix is consequently either transmitted at the polarization beam splitter in the direction of the light source or reflected in the direction of the sample region (onto a common beam path with transmitted reflection light), or partly reflected and partly transmitted in the case of elliptical polarization.

The first and second beam paths preferably have the same optical path length.

The variant described above can also be modified in such a manner that no half-wave plate is required. Here, the alignment of the liquid crystal matrix can be set at an angle of 45° relative to both the polarization direction of the reflection light and the polarization direction of the transmission light. Depending on an on- or off-state of the liquid crystal elements, a 90° polarization rotation or no polarization rotation at the liquid crystal matrix results therefrom. It can also be set here whether reflected transmission/reflection light at the polarization beam splitter is directed further toward the sample or back toward the light source. A variable elliptical polarization can in turn be set via intermediate states of the liquid crystal elements, which results in partial reflection and partial transmission at the polarization beam splitter.

An imprinted structure can have a polarization that varies over a cross section of the reflection or transmission light. For different pixels/portions of the beam cross section, a polarization direction can accordingly be rotated by 0° or 90° or the polarization can be changed to elliptical polarization, independently of the remaining pixels/portions. The light structuring apparatus thus determines which parts of the reflection and transmission light are transmitted onto the common beam path, while the remaining parts are directed back in the direction of the AOTF/EOM. This creates an amplitude-modulated illumination pattern.

Instead of or in addition to a λ/2 plate, it is also possible to use a Faraday rotator in the beam path of the transmission light and/or a Faraday rotator in the beam path of the reflection light. If light passes through the Faraday rotator on a path there and back, the polarization direction of the light is rotated twice in the same direction, in contrast to a λ/2 plate, which rotates the polarization direction of light back on the return path. The Faraday rotator can be set in such a way that a polarization rotation of 90° is effected when it is traversed twice, with the result that transmission light is subsequently reflected at the polarization beam splitter or reflection light is subsequently transmitted at the polarization beam splitter. The liquid crystal regions can then be used to imprint a phase pattern onto the light over its cross section, with the result that phase-modulated illumination is provided in particular in a sample plane.

With the invention, two illuminations of different wavelengths can be modulated simultaneously and directed to a sample region. However, it is also possible to direct two or more different wavelengths in succession, and not necessarily simultaneously, to the sample region for color-sequential measurements. An additional AOTF may be present upstream of the polarization beam splitter, as a result of which illumination light passes through both AOTFs. For color sequential measurements, the additional AOTF can quickly switch between different wavelengths, for which different structures are provided at the two regions of the liquid crystal matrix.

The invention also relates to a light microscope with an optics arrangement, which can be designed as described here. The light microscope includes a light source connection. A light source, for example several lasers or a broadband light source, can be coupled to the light source connection. The light source connection is designed in a manner such that, when a light source is connected, its light passes through the beam path described here. In addition, the light microscope can comprise a detector connection to which a light detector can be connected. Said light detector can be designed as a spatially resolving camera.

The properties of the invention described as additional optics arrangement features also yield variants of the method according to the invention when used as intended. Conversely, the components of the optics arrangement described can also be set up to carry out the method variants.

BRIEF DESCRIPTION OF THE DRAWINGS

Further advantages and features of the invention will be described below with reference to the appended schematic figures, wherein.

DETAILED DESCRIPTION OF THE DRAWINGS

Identical and identically acting constituent parts are generally identified by the same reference signs in the figures.

Figure 1:
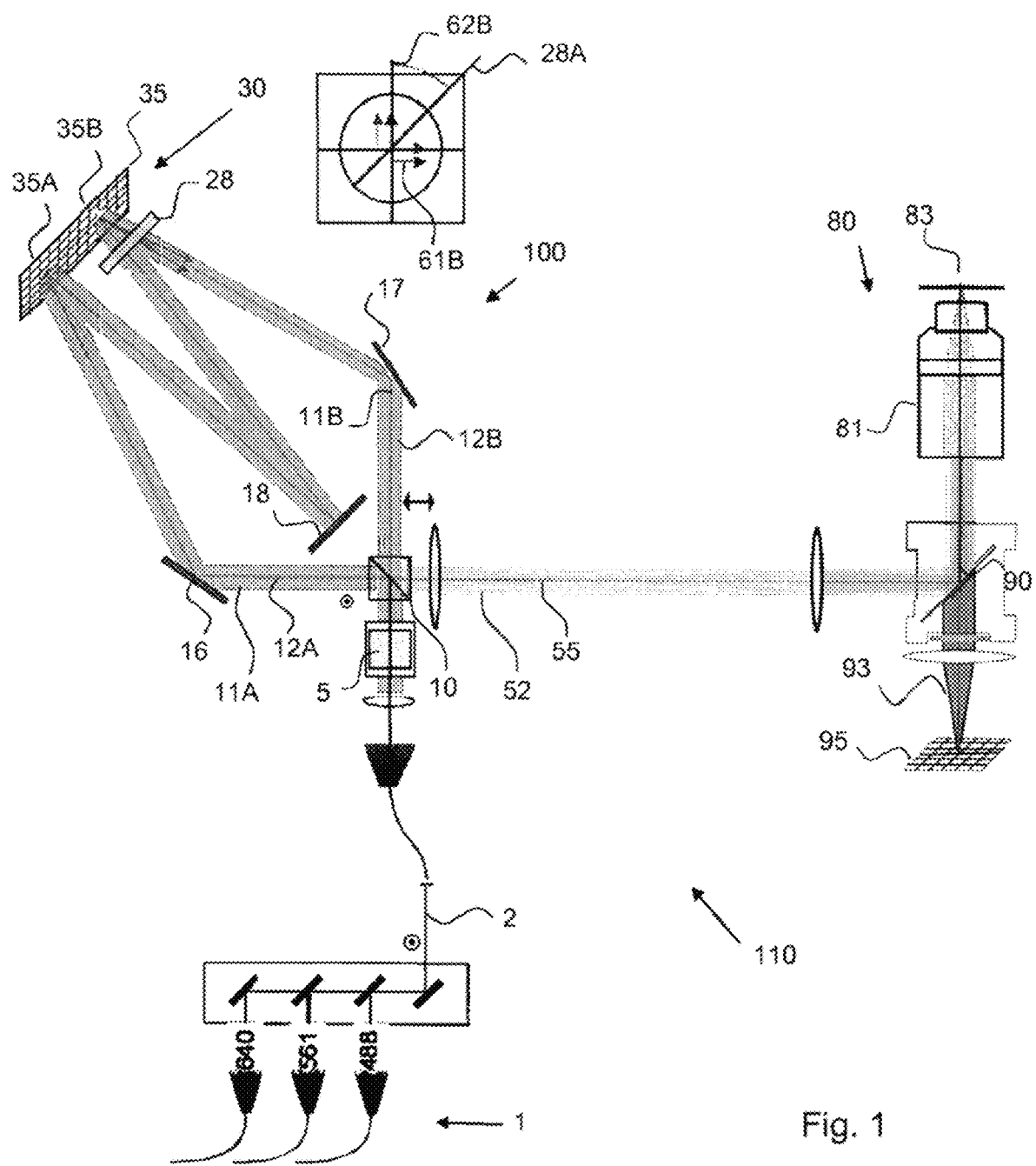
FIG. 1 shows a schematic illustration of a first exemplary embodiment of a light microscope according to the invention.

FIG. 1 shows an exemplary embodiment of an optics arrangement 100 according to the invention, which is part of a light microscope 110 according to the invention.

The light microscope 110 comprises a light source 1 (not shown here in more detail), which emits illumination light 2. The light source 1 can comprise, for example, a plurality of lasers, the beam paths of which are combined onto a common beam path by a mirror cascade.

The optics arrangement 100 comprises a light structuring apparatus 30 which imprints a structure onto the illumination light. The light 52 that is structured in this way is guided to a sample region 83 via optics components 80, which can in particular comprise an objective 81.

Light that is reflected by a sample in the sample region 83 is referred to as sample light 93 and can be, for example, luminescent light, that is to say fluorescent light or phosphorescent light. It can be transmitted via the same objective 81 and then separated from the beam path of the illumination light 52 by a beam splitter 90 before it is detected by a detector 95.

First, the illumination light 2 is incident on an AOTF 5. The latter can deflect a light component of the illumination light 2 with a specific selectable wavelength into a first order of diffraction. Another light component of the illumination light can pass through the AOTF 5 in the direction of a zero order of diffraction. These two light components differ not only in their wavelengths, but also in their polarizations, since the light polarization is rotated through 90° when deflected in the direction of the first order of diffraction.

Instead of the AOTF shown, an EOM can also be used. Two light beams (hereinafter: light components) that differ in their wavelengths are guided to the EOM in a time-modulated manner, i.e. temporally successively. The EOM can rotate the polarization direction of the first light component and then be switched over by a control unit in such a way that the polarization of the temporally subsequent light component is rotated in a different direction, with the result that the two light components in particular have a mutually perpendicular polarization.

These two light components of different polarizations are now guided from the AOTF/EOM to a polarization beam splitter 10. This separates the two light components into reflection light 12A and transmission light 12B. Reflection light 12A is reflected onto a first beam path 11A and (in particular at the same time) transmission light 12B is transmitted onto a second beam path 11B.

The transmission light 12B is directed to the light structuring apparatus 30 via beam deflection elements 17, for example one or more mirrors or prisms.

The light structuring apparatus 30 here comprises a liquid crystal matrix 35 as a structured element. Such a liquid crystal matrix 35 is also referred to as LCoS (liquid crystal on silicon). Incident light passes through the liquid crystal matrix 35, is reflected at its rear side (that is, in particular at the silicon chip), and passes through the liquid crystal matrix 35 again before it exits. An amplitude modulation of the incident light is not yet achieved with this alone, but phase modulation is. The liquid crystal matrix 35 comprises a plurality of liquid crystal elements that are birefringent and can be set independently of one another. Depending on the setting, a liquid crystal element can variably change the phase of incident light, but only if the polarization direction of the incident light is appropriate to the liquid crystal matrix. If the polarization direction is perpendicular to this, however, the light is transmitted without the switching states of the liquid crystal elements having any influence on a phase change of the light.

In the example of FIG. 1, the reflection light 12A and the transmission light 12B are incident on the same liquid crystal matrix 35. Since the reflection light 12A and the transmission light 12B are linearly polarized perpendicularly to one another, either only the reflection light or the transmission light would be variably phase-modulated without further measures. A polarization rotator 28 is used so that both the reflection light and the transmission light can be variably phase-modulated. Said polarization rotator can be a λ/2 plate which is oriented in such a way that it rotates the polarization of incident transmission or reflection light through 90°. This is shown in the figure insert in FIG. 1: The optical axis 28A is at an angle of 45° relative to the polarization direction 61B of the transmission light before it is incident on the half-wave plate 28, with the result that the polarization direction 61B is rotated through 90° to the polarization direction 62B. For the reflection light, the polarization rotation at the half-wave plate is exactly the opposite of the case described.

In the example shown, the reflection light 12A is first incident on a first liquid crystal region 35A of the liquid crystal matrix 35. It is then deflected via a deflection element 18, for example a mirror or a prism, and is directed a second time onto the liquid crystal matrix 35, specifically onto a second liquid crystal region 35B, which in particular can be different from or not overlapping with the first liquid crystal region 35A. Before the reflection light 12A is incident on the liquid crystal matrix 35 for the second time, it is incident on the polarization rotator 28, which rotates the polarization direction through 90°. As a result, the reflection light 12A has a different polarization in the case of the second incidence than in the case of the first incidence. The reflection light 12A is thus variably phase-modulated only either in the case of the first or the second incidence, while it does not experience any phase modulation in the case of the other incidence.

After it is incident on the liquid crystal matrix 35 for the second time, the reflection light 12A passes through the polarization rotator 28 again, as a consequence of which the polarization direction is rotated back again.

The transmission light 12B passes through the same beam path as the reflection light 12A, but in the opposite direction. Thus, the transmission light 12B is first incident on the polarization rotator 28 before it is incident on the liquid crystal matrix 35 for the first time at the liquid crystal region 35B. Then it passes through the polarization rotator 28 again and is then incident on the liquid crystal region 35A.

The reflection light 12A is accordingly phase-modulated only by the first or the second liquid crystal region 35A or 35B, while the transmission light 12B is phase-modulated by the other one of the two liquid crystal regions. As a result, different phase modulations can be imprinted onto the reflection light 12A and the transmission light 12B.

The liquid crystal elements of the first and second liquid crystal regions 35A, 35B can be set so that they produce phase gratings. In the exemplary embodiment of FIG. 1, the liquid crystal regions 35A, 35B are arranged in a pupil plane, as a result of which a light pattern is produced in a sample plane (or a plane conjugate thereto), which light pattern is related via a Fourier transform to the light pattern produced in the pupil plane. The phase pattern in the pupil plane therefore becomes an amplitude grating in a sample plane (or a plane that is conjugate thereto). In order to provide a desired amplitude grating, that is to say a desired grating-shaped intensity distribution in the sample plane, a control unit can calculate the desired phase pattern in the pupil plane via an IFTA (iterative Fourier transform algorithm) and set the liquid crystal regions accordingly.

The variant shown in FIG. 1 can also be modified such that the liquid crystal regions are not arranged in a pupil plane but in an intermediate image plane or a plane that is conjugate to the sample image plane. In this case, the phase pattern produced can also be imaged into the sample plane as a phase pattern. In this case, however, an amplitude grating can also be brought about in the sample plane in a different way: For example, a grating constant of the phase grating can be selected such that higher orders of diffraction are not directed from the optics components 80 to the sample region 83 but are blocked beforehand. Only, for example, the −1, 0 and +1 orders of diffraction are directed up to the sample region 83. This turns the original phase grating in the sample plane into an amplitude grating, that is to say, an intensity modulation.

Starting from the polarization beam splitter 10, the beam path forms a closed loop extending via the structuring device 30. In this case, the reflection light 12A and the transmission light 12B pass through the closed loop in opposite directions.

Because the polarization of the transmission light 12B when it is incident on the polarization beam splitter 10 again is the same as when it left the polarization beam splitter earlier, the transmission light 12B is transmitted in the direction of the sample region 83 and not reflected for example in the direction of the light source 1. In an analogous manner, the reflection light 12A has the same polarization when it is incident on the polarization beam splitter 10 again as when it left the polarization beam splitter earlier and is therefore reflected again. The reflection light 12A thus arrives at a common beam path 55 with the transmission light 12B.

The structured transmission light 12B and the structured reflection light 12A, that is to say the two manipulated light components of different wavelengths, now travel along a common beam path 55 and were able to obtain a desired phase or intensity pattern independently of one another.

A first beam path 11A, onto which the reflection light 12A is directed from the polarization beam splitter 10, can be understood to mean a beam path through which the reflection light 12A travels up to the structured element. A second beam path 11B, onto which the transmission light 12B is directed from the polarization beam splitter 10, can be understood, in a corresponding manner, to be a beam path through which the transmission light 12B travels up to the structured element. The transmission light 12B travels along the first beam path 11A to the polarization beam splitter 10, and the reflection light 12A travels along the second beam path 11B to the polarization beam splitter 10.

The beam deflection elements 16 or 17 can optionally be dispensed with or can be arranged elsewhere in the beam path that forms the closed loop.

In a modification of the embodiment shown, the liquid crystal matrix 35 shown can be replaced by two liquid crystal matrices. If said liquid crystal matrices are arranged perpendicular to each other in their effect direction, the polarization rotator can be dispensed with. However, since liquid crystal matrices are very expensive, this design is associated with higher costs.

Figure 2:
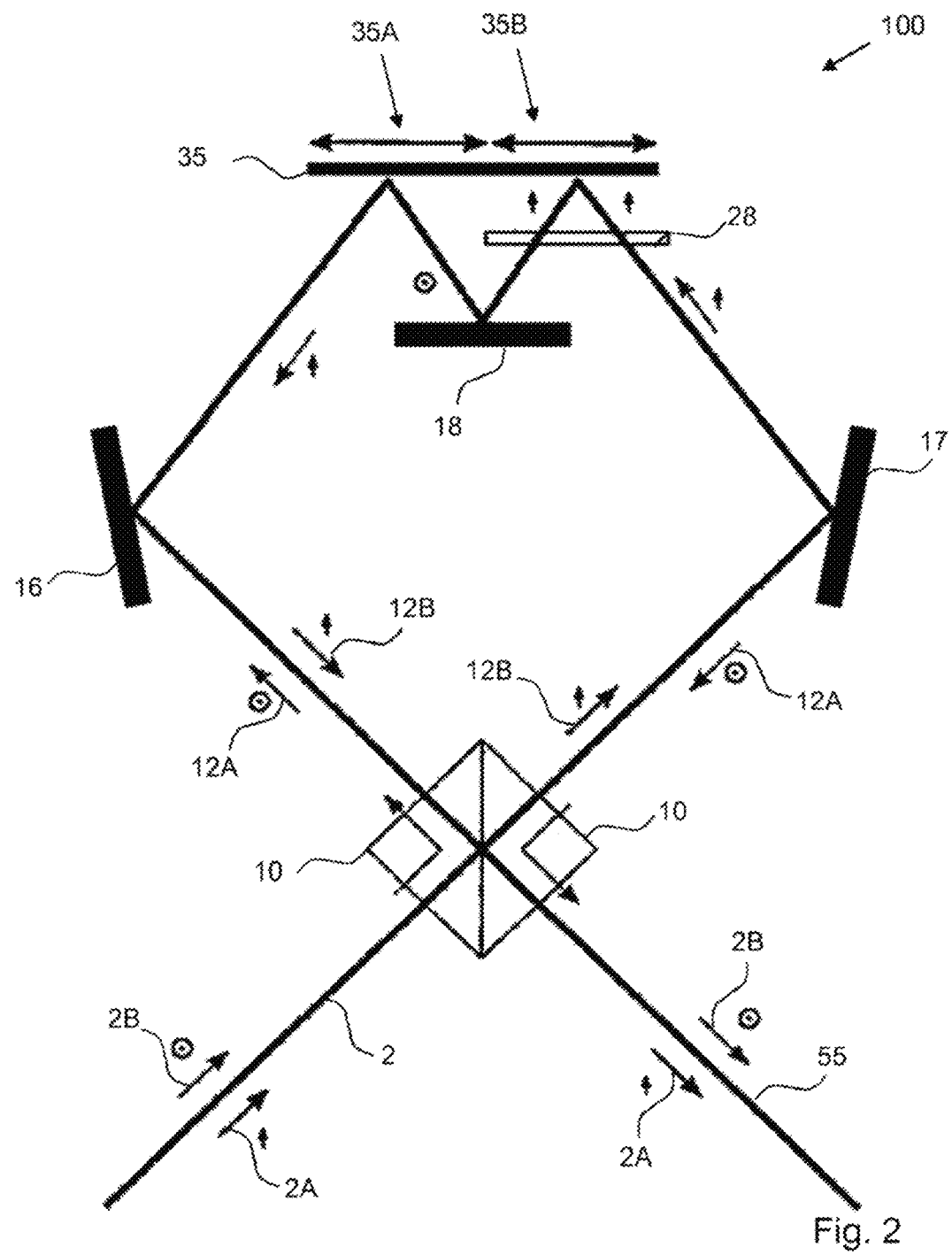
FIG. 2 shows a schematic illustration of components of an exemplary embodiment of an optics arrangement according to the invention.

FIG. 2 shows a schematic top view of components of an optics arrangement 100 according to the invention, which may be substantially the same as the optics arrangement from FIG. 1. FIG. 2 shows the propagation directions of the illumination light 2, of the reflected light 12A, and of the transmitted light 12B by way of arrows. In addition, the polarization directions are partially indicated here. The illumination light 2 comprises the two light components 2A, 2B of different wavelengths that have the indicated different polarizations. In addition, the polarization directions of the transmission light 12B, which corresponds to the light component 2B, are indicated on the different beam path portions. As shown, the polarization direction is changed twice by the polarization rotator 28. The polarization direction of the reflection light 12A is perpendicular to that of the transmission light 12B on each beam path portion and is not shown in FIG. 2 for reasons of clarity. Both polarization directions of the reflection light 12A (light component 2A) and the transmission light 12B (light component 2B) are shown on the common beam path 55.

Figure 3:
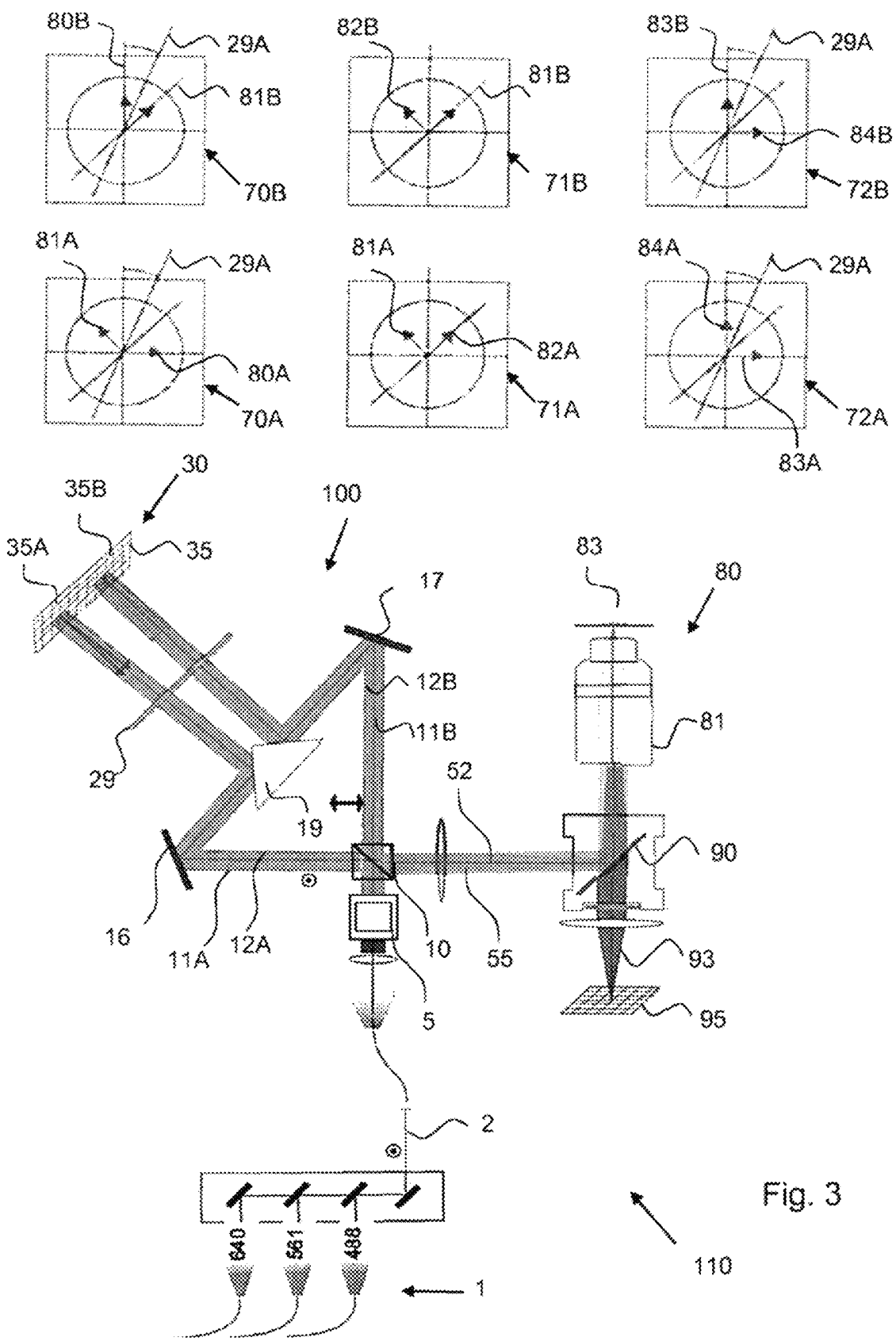
FIG. 3 shows a schematic illustration of a further exemplary embodiment of a light microscope according to the invention.

A further exemplary embodiment of an optics arrangement 100 according to the invention, which can be part of a light microscope 110 according to the invention, is shown in FIG. 3.

Components which are designed in the same way as in FIG. 1 or FIG. 2 are denoted by the same reference signs and are not described again here. The two light components of different wavelengths and polarizations are also split here by a polarization beam splitter 10 onto different beam paths 11A and 11B. However, the two beam paths 11A and 11B do not form a closed loop. Rather, the reflection light 12A travels along the beam path 11A up to a first region 35A of the liquid crystal matrix 35 and back to the polarization beam splitter 10 along the same beam path 11A. Analogously, the transmission light 12B travels along the second beam path 11B up to a second region 35B of the liquid crystal matrix 35 and back to the polarization beam splitter 10 along the same beam path 11B. Different sides of a common deflection element 19 can be used in the two beam paths 11A and 11B, with the result that the transmission light 12A and the reflection light 12B travel close to each other and parallel to the liquid crystal matrix 35 and are incident thereon perpendicularly.

The liquid crystal matrix 35 is here located in an intermediate image plane, wherein the construction can also be modified such that the liquid crystal matrix 35 is arranged in a pupil plane.

To prevent the reflection light 12A and the transmission light 12B from traveling back to the AOTF 5 at the polarization beam splitter 10, the polarization of the reflection light 12A on the beam path 11A and the polarization of the transmission light 12B on the beam path 11B must change by 90°. This is achieved by means of a polarization rotator 29 together with the liquid crystal matrix 35. The polarization rotator 29 here is a half-wave plate (λ/2 plate), the dimensions of which are sufficiently large for it to be arranged both in the beam path 11A and in the beam path 11B. The polarization of the reflection light 12A is shown in figure portions 70A, 71A, and 72A. 70A shows the optical axis 29A of the half-wave plate 29 and the polarization direction 80A of the reflection light before it passes through the half-wave plate 29 and also the polarization direction 81A of the reflection light that is rotated thereby in particular through 135°. Figure portion 71A shows how this polarization direction 81A can change owing to the liquid crystal matrix 35. The latter is aligned in such a way that, depending on the switching state of the liquid crystal elements, it performs a change in polarization, in particular a polarization rotation. When a liquid crystal element is in an off state, it does not variably vary the phase, and the polarization direction remains the same, that is to say, the polarization direction remains 81A unchanged. In contrast, in an on-state, the liquid crystal element retards the phase of the polarization component which lies in the horizontal direction in figure portion 71A; as a result, the polarization direction can be rotated to 82A, especially if the horizontal polarization component is shifted from 81A by half a wavelength (or by an integer multiple of the wavelength plus half a wavelength) relative to the vertical polarization component. The liquid crystal element can also be set to various intermediate states in which a different phase shift is set (not illustrated). This produces an elliptical polarization. In the case shown, the reflection light now travels from the liquid crystal matrix back to the half-wave plate, where the polarization direction is rotated again, as shown in figure portion 72A: Due to the alignment 29A of the optical axis 29, for a liquid crystal element in the on-state, the polarization direction 82A is rotated through 45° to 84A, that is to say the polarization direction is at an angle of 90° relative to the original polarization state. The reflection light is thus now transmitted at the polarization beam splitter. On the other hand, for a liquid crystal element in the off-state, the polarization direction 81A is rotated through 67.5° to 83A, that is to say the polarization direction is again as it was in the original state. This part of the reflection light is therefore reflected at the polarization beam splitter back toward the light source and does not reach the common beam path 55.

The corresponding situations for the transmission light are shown in the figure portions 70B, 71B, and 72B. The polarization direction 80B of the transmission light is initially at an angle of 22.5° with respect to the orientation 29A of the half-wave plate and is therefore rotated through 45° into the polarization direction 81B. Now the transmission light is incident on the liquid crystal matrix, where the polarization direction 81B remains unchanged when a liquid crystal element is in an off-state (see figure portion 71B) or is rotated to 82B in the case the liquid crystal element is in an on-state. When the transmission light is incident on the half-wave plate again, the polarization direction 81B is rotated through 45° into the direction 83B which, as is shown in figure portion 72B, corresponds exactly to the original polarization 80B. That is to say, in this case, transmission light is transmitted again at the polarization beam splitter, in the direction of the light source. By contrast, the polarization direction 82B, which is produced when a liquid crystal element is in an on-state, is at an angle of 67.5° with respect to the half-wave plate and is therefore rotated through 135° thereby so that the resulting polarization direction 84B is perpendicular to the original polarization 80B and the transmission light is now reflected at the polarization beam splitter onto the common beam path 55.

Therefore, the liquid crystal matrix, together with the polarization beam splitter and the polarization rotator, can imprint an intensity distribution that is variably settable over the respective beam cross section onto the first and the second light component. This is advantageously done independently for both light components, and the liquid crystal matrix enables quick changes in the intensity distributions without the need for more time-consuming displacements or rotations of components.

In a modification of the embodiment of FIG. 3, the half-wave plate can be dispensed with, in particular if the alignment of the liquid crystal matrix is at an angle of 45° to both the polarization direction of the reflection light and the polarization direction of the transmission light. In this case, it is also possible, in dependence on an on-state or off-state of the liquid crystal elements, to attain a 90° polarization rotation or no polarization rotation at the liquid crystal matrix. Accordingly, it is also possible to set here whether reflected transmission/reflection light is directed further toward the sample or back toward the light source at the polarization beam splitter.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Light source
2 Illumination light
5 AOTF
10 Polarization beam splitter
11A First beam path
11B Second beam path
12A Reflection light
12B Transmission light
16, 17, 18, 19 Deflection elements
28 Polarization rotator, half-wave plate
28A Optical axis of half-wave plate 28
29 Polarization rotator, half-wave plate
29A Optical axis of half-wave plate 29
30 Light structuring apparatus
35 Liquid crystal matrix
35A First region of the liquid crystal matrix
35B Second region of the liquid crystal matrix
52 Structured illumination light
55 Common beam path
61B Polarization direction of the transmission light before passing through the polarization rotator 28
62B Polarization direction of the transmission light after passing through the polarization rotator 28
70A, 71A, 72A Diagrams of the polarization change of the reflection light
70B, 71B, 72B Diagrams of the polarization change of the transmission light
80 Optics components
80A, 81A, 82A, 83A, 84A Polarization directions of the reflection light
80B, 81B, 82B, 83B, 84B Polarization directions of the transmission light
83 Sample region
90 Beam splitter
93 Sample light
95 Detector
100 Optics arrangement
110 Light microscope

The invention claimed is:

1. An optics arrangement for flexible multi-color illumination for a light microscope
comprising an acousto-optical tunable filter (hereinafter "AOTF"), which is configured to diffract two light components from incident illumination light into different order-of-diffraction directions, wherein the two light components differ in their wavelengths and polarizations, or comprising an electro-optical modulator (hereinafter "EOM"), with which two temporally successive light components of different wavelengths are set to different polarization directions;
further comprising:
a polarization beam splitter that is arranged such that the two light components of different wavelengths and polarizations of the AOTF or EOM are incident thereon and are separated in dependence on the polarization into reflection light, which is reflected at the polarization beam splitter, and transmission light, which is transmitted at the polarization beam splitter; and
a light structuring apparatus to imprint different structures onto the transmission light and the reflection light;
wherein the polarization beam splitter or a further polarization beam splitter is arranged to combine the structured transmission light and the structured reflection light onto a common beam path.

2. The optics arrangement as claimed in claim 1, further comprising
optics components for jointly transmitting the two light components on a common beam path from the AOTF or EOM to the polarization beam splitter,
the optics components are arranged in such a way that the jointly transmitted light components comprise light of a zero order of diffraction and a first order of diffraction of the AOTF or EOM.

3. The optics arrangement as claimed in claim 2, wherein
the optics components have a dispersion by means of which a difference in the propagation directions of the two light components is reduced.

4. The optics arrangement as claimed in claim 1, wherein the light structuring apparatus comprises at least one liquid crystal matrix or region that has a plurality of independently switchable liquid crystal elements with which a phase of incident transmission light and reflection light is changeable in a settable manner.

5. The optical arrangement as claimed in claim 1, wherein the polarization beam splitter, the light structuring apparatus, and beam deflection elements are arranged such that they form a closed loop as a beam path, which beam path is traversed by the transmission light and the reflection light in opposite directions.

6. The optics arrangement as claimed in claim 4, wherein
the at least one liquid crystal matrix comprises a first and a second liquid crystal region;
wherein the reflection light is first directed onto the first liquid crystal region and then onto the second liquid crystal region on the beam path, which forms a closed loop starting from the polarization beam splitter, and has a polarization direction by way of which the phase of the reflection light is variably influenced only by one of the two liquid crystal regions;
wherein the transmission light is first directed onto the second liquid crystal region and then onto the first liquid crystal region and has a polarization direction by way of which the phase of the transmission light is variably influenced only by the other of the two liquid crystal regions.

7. The optics arrangement as claimed in claim 4, wherein the first and second liquid crystal regions are regions of the same liquid crystal matrix;
further comprising a polarization rotator for rotating the polarization direction of incident light through 90° and arranged in such a way that one of the transmission light and the reflection light is incident first on the polarization rotator, then on a second liquid crystal region, then again on a polarization rotator, and then on a first liquid crystal region;
while the other of the transmission and reflection light is incident on said polarization rotator and the first and second liquid crystal regions in the reverse order.

8. The optics arrangement as claimed in claim 4, wherein liquid crystal regions and polarization directions of the transmission light and of the reflection light are aligned such that both the transmission light and the reflection light each remain uninfluenced when they are first incident on one of the two liquid crystal regions and are influenced when they are incident on the liquid crystal regions for the second time.

9. The optics arrangement as claimed in claim 4, further comprising
beam deflection elements which are arranged between the polarization beam splitter and the liquid crystal matrix in a manner such
that reflection light is directed from the polarization beam splitter along a first beam path to a liquid crystal region of the liquid crystal matrix and is directed back to the polarization beam splitter along the same first beam path, wherein the liquid crystal matrix is arranged in such a way that, depending on a switching state of the liquid crystal elements thereof, a polarization change, is variably brought about,
wherein a first polarization rotator is arranged on the first beam path,
whereby the reflection light coming back from the liquid crystal matrix is settably transmitted at the polarization beam splitter in the direction of a sample region, reflected in the direction of the light source, or transmitted and reflected in settable proportions;
that transmission light is directed from the polarization beam splitter along a second beam path to a different liquid crystal region of the liquid crystal matrix and is directed back to the polarization beam splitter along the same second beam path, wherein the liquid crystal matrix is arranged in such a way that, depending on the switching state of the liquid crystal elements thereof, a polarization change is variably brought about;
wherein the first polarization rotator or a second polarization rotator is arranged in the second beam path,
whereby the transmission light coming back from the liquid crystal matrix is settably reflected at the polarization beam splitter in a direction of the sample region onto a common beam path with transmitted reflection light, is transmitted in a direction of the light source, or transmitted and reflected in settable proportions.

10. The optics arrangement as claimed in claim 9, wherein
the beam deflection elements are arranged such that the reflection light is incident perpendicularly on the liquid crystal region, and the transmission light is incident perpendicularly on another liquid crystal region.

11. The optics arrangement as claimed in claim 9, wherein the reflection light and the transmission light pass via the first polarization rotator, which is a $\lambda/2$ plate, an optical axis of which forms an angle of about 22.5° relative to a polarization direction of the reflection light and an angle of about 67.5° relative to a polarization direction of the transmission light, or vice versa.

12. The optics arrangement as claimed in claim 1, further comprising
an additional AOTF upstream of the polarization beam splitter, with which a further wavelength selection is made possible for color-sequential measurements.

13. A light microscope comprising an optics arrangement as claimed in claim 1.

14. A method for flexible multi-color illumination for a light microscope, comprising
using an AOTF to diffract two light components from incident illumination light into different order-of-diffraction directions, wherein the two light components differ in their wavelengths and polarizations, or wherein an EOM is used to set two temporally successive light components of different wavelengths to different polarization directions;
separating the two light components of different wavelengths and polarizations using a polarization beam splitter into reflection light, which is reflected at the polarization beam splitter, and transmission light, which is transmitted at the polarization beam splitter;
imprinting different structures onto the transmission light and the reflection light using a light structuring apparatus; and
using the polarization beam splitter or a further polarization beam splitter to combine the structured transmission light and the structured reflection light onto a common beam path.

15. The method as claimed in claim 14, wherein
an imprinted structure has a polarization which varies over a cross section of the reflection or transmission light, as a result of which a part of the reflection or transmission light that is specifiable by the light structuring apparatus is transmitted at the polarization beam splitter onto the common beam path, and a remaining part is directed back in the direction of the AOTF.

* * * * *